United States Patent [19]
Akyol et al.

[11] Patent Number: 5,835,481
[45] Date of Patent: Nov. 10, 1998

[54] FAULT TOLERANT LANE SYSTEM

[76] Inventors: Cihangir M. Akyol, 117 Escobar Ave., Los Gatos, Calif. 95032; Bradley A. Benson, 309 La Cuesta Dr., Portola Valley, Calif. 94028; Norman W. Finn, 5416 Makati Cir., San Jose, Calif. 95123; Steven H. Jay, 1122 Vanessa Dr., San Jose, Calif. 95126

[21] Appl. No.: 703,938

[22] Filed: Aug. 28, 1996

[51] Int. Cl.⁶ ........................................ H04J 1/16
[52] U.S. Cl. ............................ 370/216; 370/395
[58] Field of Search .................... 370/389, 404, 370/257, 396, 469, 408, 395, 216, 217, 218, 225, 401, 403, 407, 406, 827, 825.01; 395/180, 181; 379/221

[56] References Cited

U.S. PATENT DOCUMENTS

| | | | |
|---|---|---|---|
| 5,317,562 | 5/1994 | Nardin et al. | 370/16 |
| 5,473,599 | 12/1995 | Li et al. | 370/16 |
| 5,581,552 | 12/1996 | Civanlar et al. | 370/396 |
| 5,600,644 | 2/1997 | Chang et al. | 370/257 |
| 5,617,417 | 4/1997 | Sathe et al. | 370/394 |

OTHER PUBLICATIONS

"Lan Emulation over ATM", Version 2, LUNI Specification, Draft 4, ATM Forum/95–1081R4, pp. 1–151, Oct. 1996.
"LAN Emulation Over ATM Specification", Version 1.0, ATM Forum 94, pp. 1–139.

*Primary Examiner*—Dang Ton
*Attorney, Agent, or Firm*—Beyer & Weaver, LLP

[57] ABSTRACT

A system and method are disclosed for providing a redundancy scheme in an ATM network providing a LAN emulation. The ATM network includes a set of LAN Emulation Connection Servers (LECS's) which connect with each other to determine which servers are operational and to automatically select an operational master LECS. The master LECS maintains a back end verification circuit with a set of operational LAN Emulation Servers (LES's), determines which operational LES will be the master LES, and directs LAN Emulation Clients (LEC's) to that LES. LEC's which lose their LES connection are directed to the proper LECS by a table stored in the ATM switch.

31 Claims, 14 Drawing Sheets

| | 402 SOURCE | 404 MASTER | 406 SLAVE |
|---|---|---|---|
| 408 | Higher LECS | Change to Slave State Disconnect all non-LECS Connections | Accept/Remain Slave |
| 410 | Lower LECS | Error Message/NC | Error message/NC |
| 412 | LEC | Accept | Reject |

Figure 4A

| | 402 SOURCE | 404 MASTER | 406 SLAVE |
|---|---|---|---|
| 414 | Higher LECS | — | If no higher LECS connections remain, become master |
| 416 | Client | NC | — |

Figure 4B

| 900 LES SOURCE | 902 MASTER | 904 SLAVE |
|---|---|---|
| 906 Lower LES than Master LES | accept/note change | reject |
| 908 Higher LES than Master LES | accept/change Master LES disconnect back end verification circuit with former Master LES | reject |

Figure 9A

| 900 LES SOURCE | 902 MASTER | 904 SLAVE |
|---|---|---|
| Slave LES | note in LES table; NC | — |
| Master LES | reorder table/make next LES the master | — |

Figure 9B

FAULT TOLERANT LANE SYSTEM

BACKGROUND OF THE INVENTION

The present invention relates to Local Area Network (LAN) emulation (LANE) systems having redundant edge device hardware including LAN Emulation Configuration Servers (LECS's) and LAN Emulation Servers (LES's). More specifically, the invention provides "slave" edge devices of each type which are inactive, along with a "master" device of each type which is active. The "slave" devices back up the master device in case it should fail. The invention further provides a system and method for detecting failure, determining the appropriate slave device to redesignate as the master, and directing LAN Emulation Clients (LEC's) and LES's to the correct master device.

Purpose of LAN Emulation

In general, the purpose of Asynchronous Transfer Mode (ATM) LAN Emulation (LANE) is to emulate a multiple-access, broadcast media (e.g., ethernet) over a point-to-point, virtual circuit oriented media (ATM). The specification for LAN Emulation over an ATM may be found in the LANE ATM specification, "LAN emulation over ATM" version 1.0 Document No. AF-LANE-0021 (the "LANE specification") which is herein incorporated by reference. It is necessary to emulate the services available over the LAN so that the existing base of software can take advantage of the ATM network. LANE provides an easy way to connect existing LAN applications into the ATM environment by supporting "unmodified" interaction amongst legacy applications on the ATM network, and by supporting the interconnection of ATM networks with legacy LAN's. This provides interoperability between applications on the ATM network and those on legacy LANs.

LAN Emulation Components

FIG. 1A shows the components of an emulated LAN (ELAN) implemented over an ATM network 100. The ELAN components include at least one LEC 102. LEC 102 may include endstations (e.g., hosts), routers or bridges and each LEC 102 is responsible for setting up the association with the ELAN assets to provide LANE services to a local host or router. Two other components of the LANE service are a LAN Emulation Server (LES) 104 and a Broadcast and Unknown Server (BUS) 106. LES 104 provides a registration facility to allow clients to register unicast and multicast media access control (MAC) addresses and/or ring route descriptors, and a forwarding service for control frames. BUS 106 receives frames from LEC 102 and retransmits them to other LEC's on the ELAN. The LANE Service may use more than one BUS, and the BUS 106 may be distributed over multiple physical entities or collocated on a single box. In certain implementations, a single LES/BUS is collocated on one router. Another ELAN component, an LECS 108, enables LEC 102 to find and to connect to LES 104 for the proper ELAN over the ATM network 100.

LES 104 and LECS 108 are referred to as "edge devices" on the ELAN because they are not required for the operation of the ATM network itself, but are required in order for the ATM network to emulate a LAN. The functions and protocols implemented or these devices is further described in the LANE specification and it is assumed that the reader is familiar with its contents.

The LECS, LES and BUS may be implemented on various network devices including switches, hosts, routers or bridges. Any device which includes an ATM interface and can support virtual circuits may function as the LECS or LES, including a PC with an ATM interface. Such devices include a processor capable of executing logic operations and memory, along with an ATM interface. Based on the operations executed by the processor, the device is able to process outside events, record those events in memory, and also to determine states and store those states in memory.

FIG. 1B shows how LEC 102 connects to the LANE service so that LEC 102 may perform data forwarding, address resolution and registration of MAC addresses with LES 104. When LEC 102 wishes to connect to an ELAN, it locates LECS 108 on ATM network 100 at a well-known address, and then sets up a point to point configure direct connection 112 with LECS 108. LECS 108 services configuration requests from LEC 102 and tells LEC 102 which ELAN it should join and the address of the LES which it should use. LEC 102 then sets up a control direct connection 114 with LES 104. LES 104 establishes a point to multipoint connection 116 with LEC 102, as well as with any other LEC 110 on the ELAN. Finally, LEC 102 establishes a multicast send point to point connection 118 with BUS 106 and a point to multipoint multicast forward connection 120 is set up between BUS 106 and LEC 102 and any other LEC 110.

Once LEC 102 registers with LES 104, it receives address resolution requests for unregistered destinations from LES 104. LES 101 provides a registration facility to allow clients to register unicast and multicast MAC addresses and/or token ring route descriptors, and a forwarding service for control frames. Optionally, it may generate control frames. Bridges may register with LES 104 any MAC addresses that they are capable of forwarding. BUS 106 receives frames from clients or other multicast servers, and retransmits them to other clients. There is at least one BUS in an emulated LAN which handles broadcast and multicast addresses.

In order for the ELAN to function, the servers which function as LES 104 and LECS 108 must remain operational. When LEC 102 wants to participate in the ELAN, it must first ask LECS 108 for the address of LES 104 and then execute a joining procedure with the LES. When this transaction is completed, LEC 102 connects to LES 104. This completes the joining of LEC 102 to the ELAN. LEC 102 must maintain a control direct connection with LES 104 as long as it continues to be connected to the ELAN. LES 104 and LECS 108 therefore represent potential single points of failure for the ELAN. Although the LANE specification details the operation of the LECS's and the LES's as described above, there is no provision for a system of redundant or backup servers.

What is needed therefore is a redundancy scheme which provides a way for backup or slave servers to automatically and transparently take over the tasks of a failed master server so that the LANE service may continue to operate without significant disruption. Because LES 104 and LECS 108 may be interconnected to a numerous and changing group of LEC's, a way is also needed to not only detect failure of these edge devices and redesignate a slave or backup device as the master device, but also to reconnect the LEC's to the new master devices with minimum disruption. Furthermore, if such a redundancy scheme could be implemented with a minimum of impact to the LANE specification, a truly robust system could be realized.

SUMMARY OF THE INVENTION

The present invention provides a system and method which provides a set of LECS's which connect with each other to determine which servers are operational and to automatically select an operational master LECS. The master LECS maintains a back end verification circuit with a set of operational LES's, determines which operational LES will be the master LES, and directs LEC's to that LES.

LEC's which lose their LES connection are directed to the proper LECS by a table stored in the ATM switch.

In one aspect, the present invention provides a method of selecting a master LECS from among a plurality of LECS's in an ATM network implementing a LAN emulation. The method may be characterized as including the following steps: (1) determining a relative hierarchical position among the plurality of LECS's, the relative hierarchical position specifying that a given LECS is a higher LECS with respect to other LECS's in lower hierarchical positions and the given LECS is a lower LECS with respect to other LECS's in higher hierarchical positions; (2) establishing a connection from the LECS to any other LECS's which are lower LECS's with respect to the LECS; (3) detecting any connections made by higher LECS's; and (4) if a connection is detected from a higher LECS, assuming the state of slave LECS, otherwise assuming the state of master LECS.

In another aspect, the present invention provides a method for establishing and maintaining a connection to a master LECS. This method may be characterized as including the following steps: (1) evaluating a hierarchical list having an order ranking a plurality of LECS's; (2) attempting connections from the device to each the LECS's according to the order the hierarchical list; (3) establishing a connection between the device and a first LECS for which an attempted connection is successful, the first LECS being a master LECS; and (4) if the first LECS is redesignated as a slave LECS, breaking the connection.

In yet another aspect, the present invention provides a method for designating a master LES. This method may be characterized as including the following steps: (1) for each LES within a set of LES's associated with the LECS, specifying a hierarchical position such that the each LES is a higher LES with respect to all other LES's in an lower hierarchical position and the each LES is a lower LES with respect to all other LES's in a higher hierarchical position; (2) establishing a verification connection from each of the LES's which is operational to the LECS; (3) maintaining data indicating which members of the set of LES's is connected to the master LECS; (4) determining the highest LES which is connected to the LECS; and (5) designating the highest LES as the master LES.

These and other features and advantages of the present invention will be presented in more detail in the following specification of the invention and the figures.

BRIEF DESCRIPTION OF THE DRAWINGS

FIG. 4A is state table which shows how each LECS will respond to connections from a source, depending on whether the LECS is in a master state or a slave state.

FIG. 4B is a state table showing the response of an LECS to a disappearing connection from a source depending on whether the LECS in master state or a slave state.

FIG. 9A is a state table which depicts the response of the LECS to incoming connections from an LES source depending on whether the LECS is in a master state or a slave state.

FIG. 9B is a state table which shows the response of an LECS to the loss of a connection from an LES.

DETAILED DESCRIPTION OF THE INVENTION

Definitions

Figure 1A:
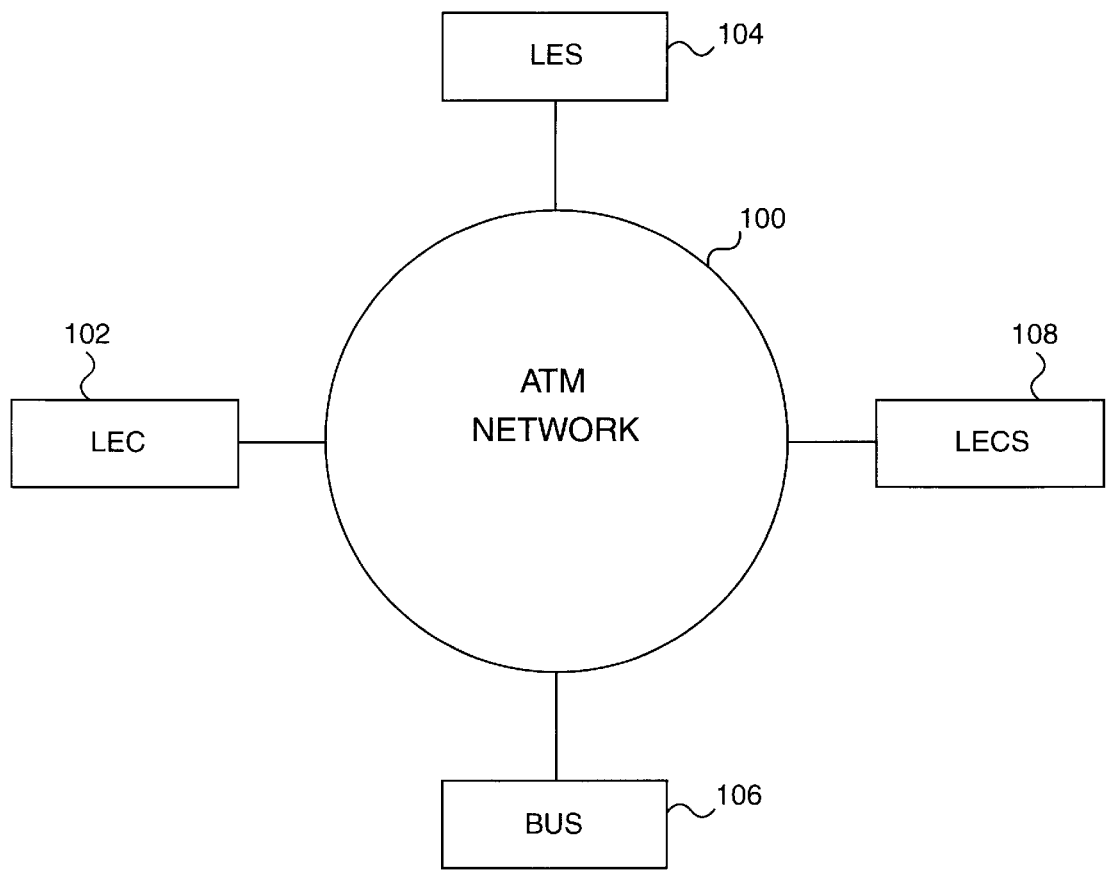
FIG. 1A shows the components of an ELAN implemented over an ATM network.
Figure 1B:
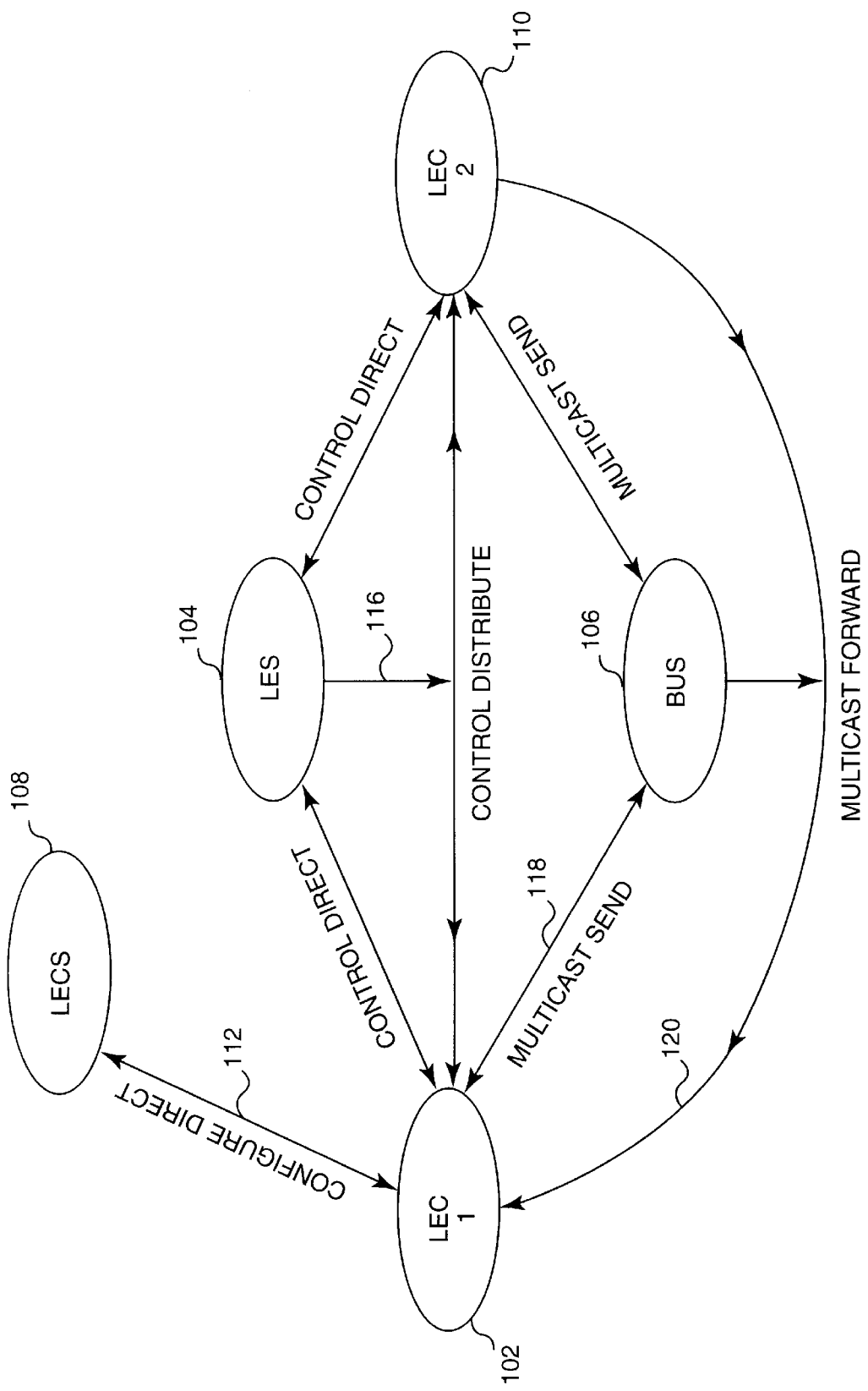
FIG. 1B shows how an LEC connects to the LANE service so that the LEC may perform data forwarding, address resolution and registration of MAC addresses with an LES.

The following terms and acronyms are used in the instant specification. Their definitions are provided here to assist in understanding the preferred embodiments described herein.

ATM address The ATM address is the address given to the User Network Interface (UNI) to identify the endpoint to which the user wishes to connect.

BUS Broadcast and Unknown Server. The BUS receives frames from LEC's and retransmits them to other LEC's on the ELAN.

ELAN Emulated LAN. The emulation of a single Ethernet LAN or Token Ring LAN segment over ATM.

LAN Local Area Network

LANE LAN Emulation. The mechanism which emulates a multicast LAN media over a circuit switched network.

LEC LAN Emulation Client. The LEC is responsible for setting up the association with the LES and BUS to provide LAN emulation services to the local host or router.

LECS LAN Emulation Configuration Server. The LECS exists somewhere in the ATM network at a well-known address and tells the LEC which ELAN it should join.

LES LAN Emulation Server. The LES provides a registration facility to allow clients to register unicast and multicast MAC addresses and/or ring route descriptors, and a forwarding service for control frames.

MAC Address A MAC address is an address of a device at the sublayer of the data link layer, defined by the IEEE 802 committee that deals with issues specific to a particular type of LAN. The types of LAN for which MAC addresses are available include token ring, FDDI, and ethernet. A MAC address is generally intended to apply to a specific physical device no matter where it is plugged into the network. Thus, a MAC address is generally hardcoded into the device—on a router's ROM, for example. This should be distinguished from the case of a network layer address, described above, which changes depending upon where it is plugged into the network. MAC is an acronym for Media Access Control.

Packet A packet is a collection of data and control information including source and destination node addresses, formatted for transmission from one node to another. In the context of this invention, it is important to note that hosts on one LAN send packets to hosts on another LAN through a router or bridge connecting the LANs.

Systems and Environment

As described below, the present invention provides methods for providing backup LECS's and LES's in a LAN emulation on an ATM network. In addition, the present invention provides apparatus for performing these back up methods. The apparatus of this invention may be specially constructed for the required purposes, or it may be a general purpose programmable machine selectively activated or configured by firmware or a computer program. Such devices preferably include an ATM interface along with a memory and a processor capable of executing logic operations. Based on the operations executed by the processor, the device is able to process outside events, record those events in memory, and also to determine states and store those states in memory. Examples of suitable machines include routers, bridges, switches, workstations, personal computers, and virtually any intelligent machine on a network. In each case, such machine must be configured to act as an LEC, LES, or LECS in accordance with this invention.

In one example, the LEC, LES, or LECS of this invention is implemented on a router. Generally, such router may include a master central processing unit (CPU), an ATM interface, and low, medium, and high speed interfaces. In preferred embodiments, the CPU is responsible for such router tasks as routing table computations and network management. It may include one or more microprocessor chips such as the MIPS R4600 reduced instruction set computer (RISC) chip, or other available chips. In a preferred embodiment, non-volatile RAM and/or ROM also form part of the CPU. Of course, there are many acceptable ways in which memory could be coupled to the system.

The interfaces may be provided as interface cards. Generally, they control the sending and receipt of data packets over the network and sometimes support other peripherals used with the router. The low and medium speed interfaces may include a multiport communications interface, a serial communications interfaces, and a token ring interface. The high speed interfaces may include an FDDI interface and a multiport ethernet interface. Preferably, each of these interfaces (low/medium and high speed) includes (1) a plurality of ports appropriate for communication with the appropriate media, and (2) an independent processor, and in some instances (3) volatile RAM. The independent processors control such communications intensive tasks as packet switching and filtering, and media control and management. By providing separate processors for the communications intensive tasks, this architecture permits the master microprocessor to efficiently perform routing computations, network diagnostics, security functions, etc.

The low and medium speed interfaces are coupled to the master CPU through a data, control, and address bus. High speed interfaces are connected to the bus through a fast data, control, and address bus which is in turn connected to a bus controller.

As noted, a properly configured device will include an ATM interface and means for supporting virtual circuits. The appropriate hardware and software for providing ATM interfaces is generally known in the field. In 1991, an entity known as the ATM Forum was founded to standardize ATM technology. A substantial body of information regarding deployment of ATM technology is available from the ATM Forum. Cites to many references pertaining to ATM technology are available through the ATM Forum's World Wide Web site at www.ATMForum.com. Specific references include McDysan et al., "ATM Theory and Application," McGraw Hill, 1995; Minoi et al., "ATM & Cell Relay Service for Corporate Environments," McGraw Hill, 1994; and Prycker "Asynchronous Transfer Mode—Solution for Broadband ISDN, 2nd Edition, Ellis Horwood, 1993. Each of these references is incorporated herein by reference for all purposes.

Specific ATM-capable hardware includes the 7000 series of routers and the LightStream® line of ATM switches available from Cisco Systems, Inc. of San Jose Calif. In addition, add-on ATM adapters are available from Cisco Systems and other companies providing networking equipment.

LAN emulation and the associated redundancy capability of this invention may be provided on the above-mentioned ATM hardware via software or hardware modules. In a preferred embodiment, software for implementing the redundancy capability is provided as a modified version of the suite of programs provided by Cisco Systems, Inc. as the Cisco Internetwork Operating System (Cisco IOS™) software for ATMs. Of course, other systems such as workstations running a UNIX operating system (e.g., a SPARCStation available from Sun Microsystems of Mountain View Calif.) may be configured to implement the present invention.

LECS Redundancy

Figure 2A:
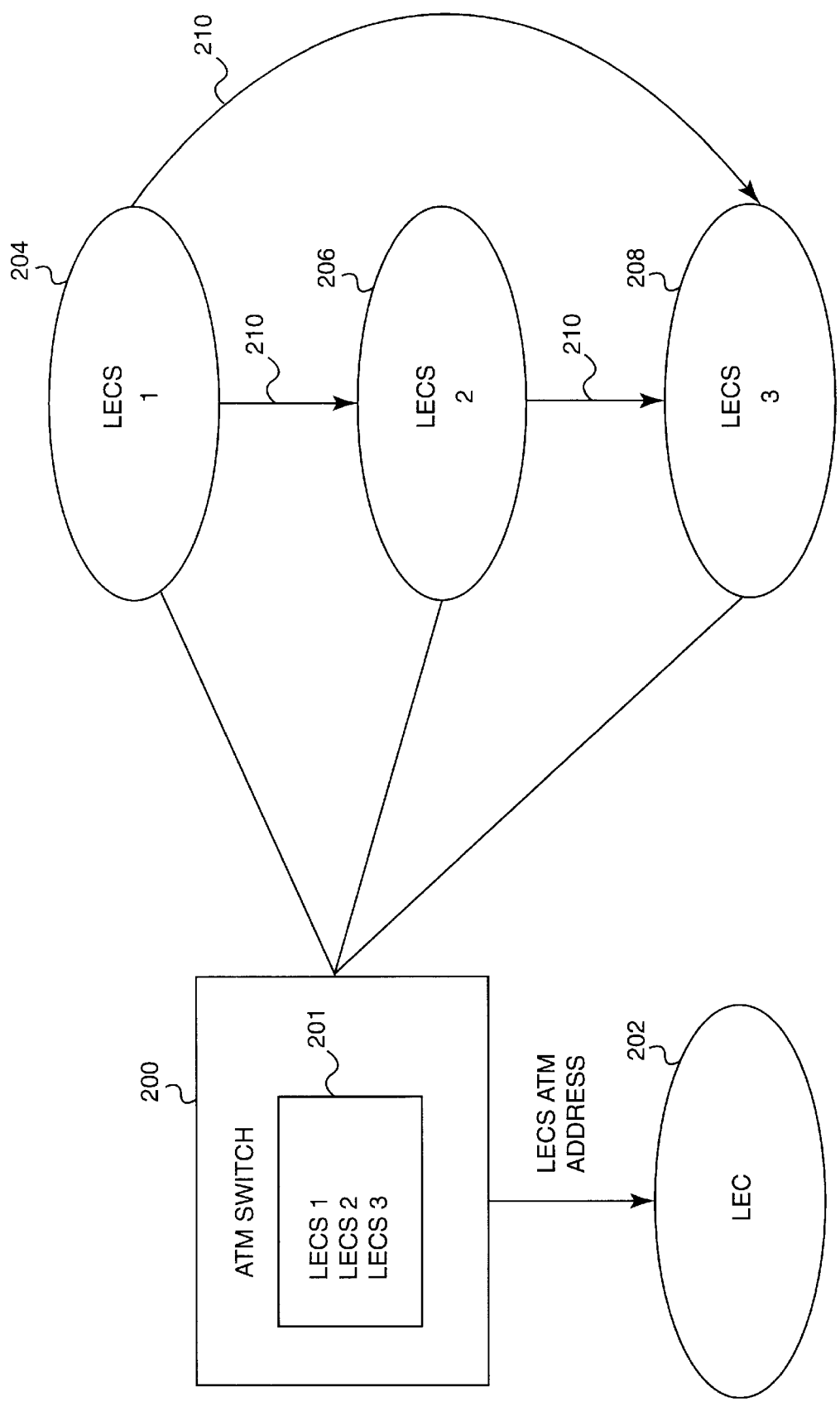
FIG. 2A is a block diagram depicting the implementation of an LECS redundancy scheme.

Turning now to the back up mechanisms of the present invention, FIG. 2A is a block diagram depicting the implementation of an LECS redundancy scheme in accordance with a preferred embodiment of the present invention. ATM switch 200 stores an ordered list 201 of LECS addresses. In alternative embodiments, ordered list 201 may be stored elsewhere at an accessible location on the network. Ordered list 201 is ordered according to a hierarchy which defines the priority of each LECS. Such hierarchy may be specified by many procedures such as manual configuring by a system administrator, automatic configuring by an algorithm which determines the relative performance of each LECS, etc.

An LEC 202 connects to ATM switch 200 and scans or downloads ordered list 201 of LECS addresses. In the example shown, LECS 204, LECS 206, and LECS 208 are assigned relative priorities one, two and three, respectively, so that LECS 204 is the primary LECS, LECS 206 is the secondary LECS, and LECS 208 is the tertiary LECS, by virtue of their respective positions in ordered list 201.

Each LECS obtains ordered list 201 from ATM switch 200 and determines its own priority within ordered list 201. Once each LECS has determined its priority and the identity of the other LECS's, it establishes a virtual circuit connection 210 with each LECS which has a lower priority in the LECS hierarchy. LECS's with a lower priority than a given LECS are referred to as "lower LECS's". Likewise, LECS's with a higher priority than a given LECS are referred to as "higher LECS's". In the example shown, LECS 204, which is the highest priority LECS, establishes a virtual circuit connection 210 with LECS 206 and LECS 208, the two lower LECS's. LECS 206 establishes a virtual circuit connection 210 with lower LECS 208, but not with higher LECS 204.

Each LECS determines whether or not it is the master LECS by checking to see if it has a virtual circuit connection 210 established with it from a higher LECS. The LECS with no virtual circuit connection 210 from a higher LECS is the master LECS. When the master LECS goes down, virtual circuit connection 210 with the next highest LECS is broken and the next highest LECS will then transition to the state of being a master LECS. This system enables each LECS to quickly determine whether a higher LECS is functioning as the master LECS and, if all higher LECS's fail, to transition to being a master LECS. An LECS does not need a positive signal from an outside source to change to the master state. The LECS will become the master LECS when it no longer detects the presence of a higher LECS.

In the scheme described above, the master LECS functions to direct LEC's to the correct LES. When the master LECS changes, there is no need for the LEC's to adjust. The LEC's only need to be able to find the master LECS the next time they need to connect to the correct LES. Preferably, this is accomplished by having the LEC's attempt LECS connections according to the ordered list found at the ATM switch. The first LECS responding to the LEC is the current master LECS.

Certain LEC's, however, do not support the capability of checking the ATM switch for an ordered list. They are configured only to connect to the master LECS at a well known address. To support those switches, the master LECS must register the well known address with the ATM switch as part of its transition to the master state. This causes that LECS to receive all connections to the well known address and intended for the master LECS. Thus, "smart" LEC's may find the master LECS by checking the ordered list, and "dumb" LEC's may find the master LECS at the well known address, since the master LECS registers the well known address at the ATM switch as part of its transition to the master state.

When a master LECS transitions to the slave state, then it deregisters the well known address at the ATM switch and no longer listens on that address. Of course, if a system is implemented which includes only "smart" LEC's, then it is no longer necessary for the LECS to register the well known address with the ATM switch as part of its transition to the master state or to de-register the well known address upon transition to the slave state.

While, the LEC's need not continuously maintain a connection with the master LECS, generally the LES's should each maintain a back end verification circuit which enables the master LECS to monitor and keep track of the status of multiple LES's, as will be described below. The back end verification circuit is a standard configure direct type of connection originated by the LES and accepted by the master LECS. It resembles a configure direct connection coming from an LEC, however, the setup message from the LES has the LES address. The LECS maintains a table of LES addresses and so the LECS is able to determine that the connection is an LES back end verification connection. As long as the back end verification connection is maintained, the LES and LECS on either side of the connection know that the device on the other side is still functioning.

Figure 2B:
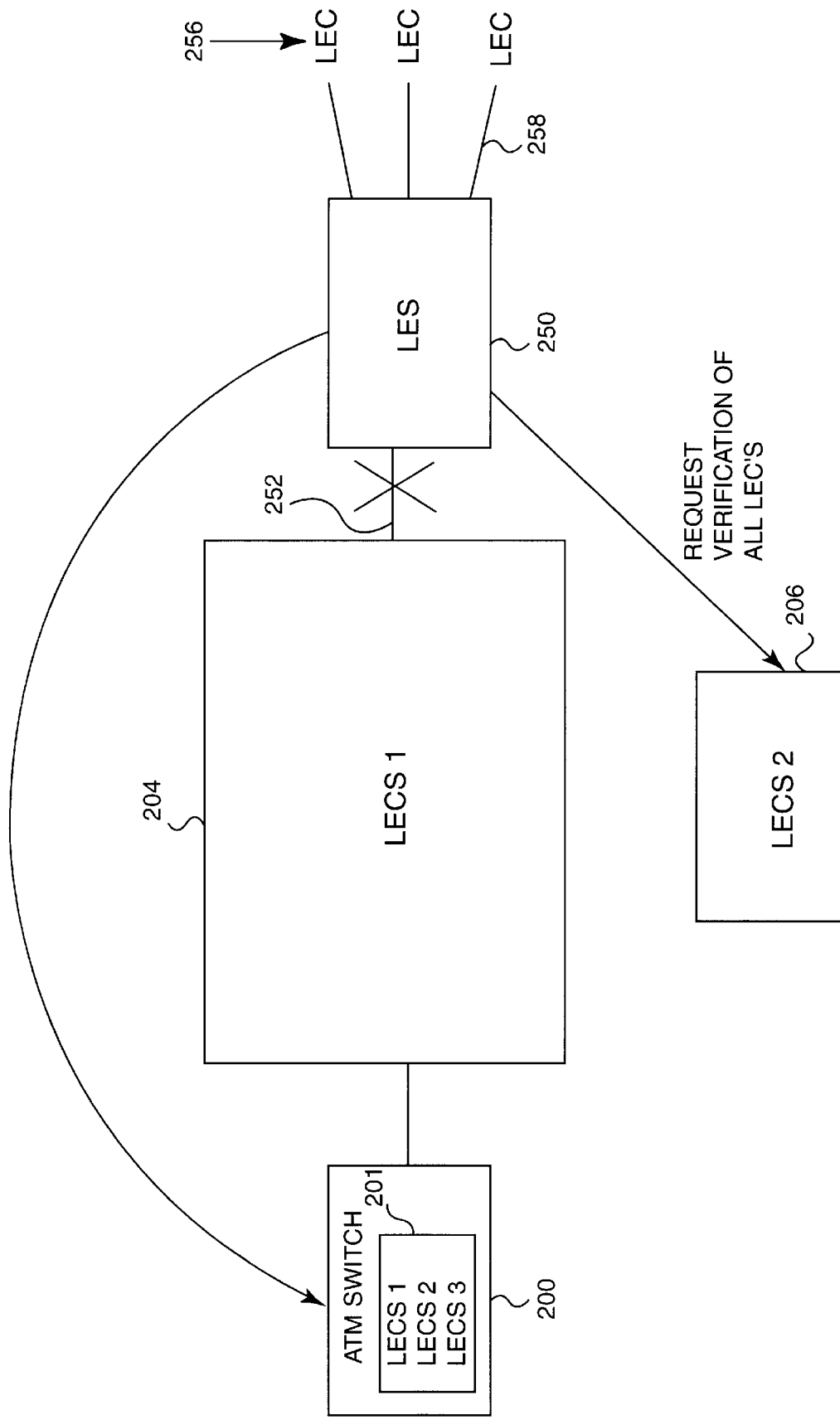
FIG. 2B shows how an LES is transferred from a primary LECS to a secondary LECS when the primary LECS becomes non-operational and the secondary LECS becomes the new master LECS.

FIG. 2B shows how LES 250 is transferred from primary LECS 204 to secondary LECS 206 when LECS 204 becomes non-operational and secondary LECS 206 becomes the new master LECS. When LECS 204, which is the master LECS becomes non-operational, a back end verification connection 252 is broken. LES 250 detects the loss of back end verification connection 252 and is programmed to obtain ordered list 201 from ATM switch 200 upon the occurrence of that event. LES 250 then attempts to connect to the LECS's whose addresses are listed in ordered list 201 in the hierarchical order until LES 250 makes a successful connection with the secondary LECS 206.

The secondary LECS has put itself in the master state because it has recognized the loss of virtual circuit connection 210 with the non-operational primary LECS 204. Once LES 250 connects with LECS 206, LES 250 requests verification of all of the LEC's 256 which are currently connected to LES 250. Since LECS 206 knows that it is now the master LECS, it verifies each LEC 256 and LES 250 maintains each connection 258 with each LEC 256. The advantage of this system is that, although the master LECS has failed and has been replaced in the ELAN by the secondary LECS 206, each connection 258 between each LEC 256 and LES 250 has not been disturbed.

Figure 3:
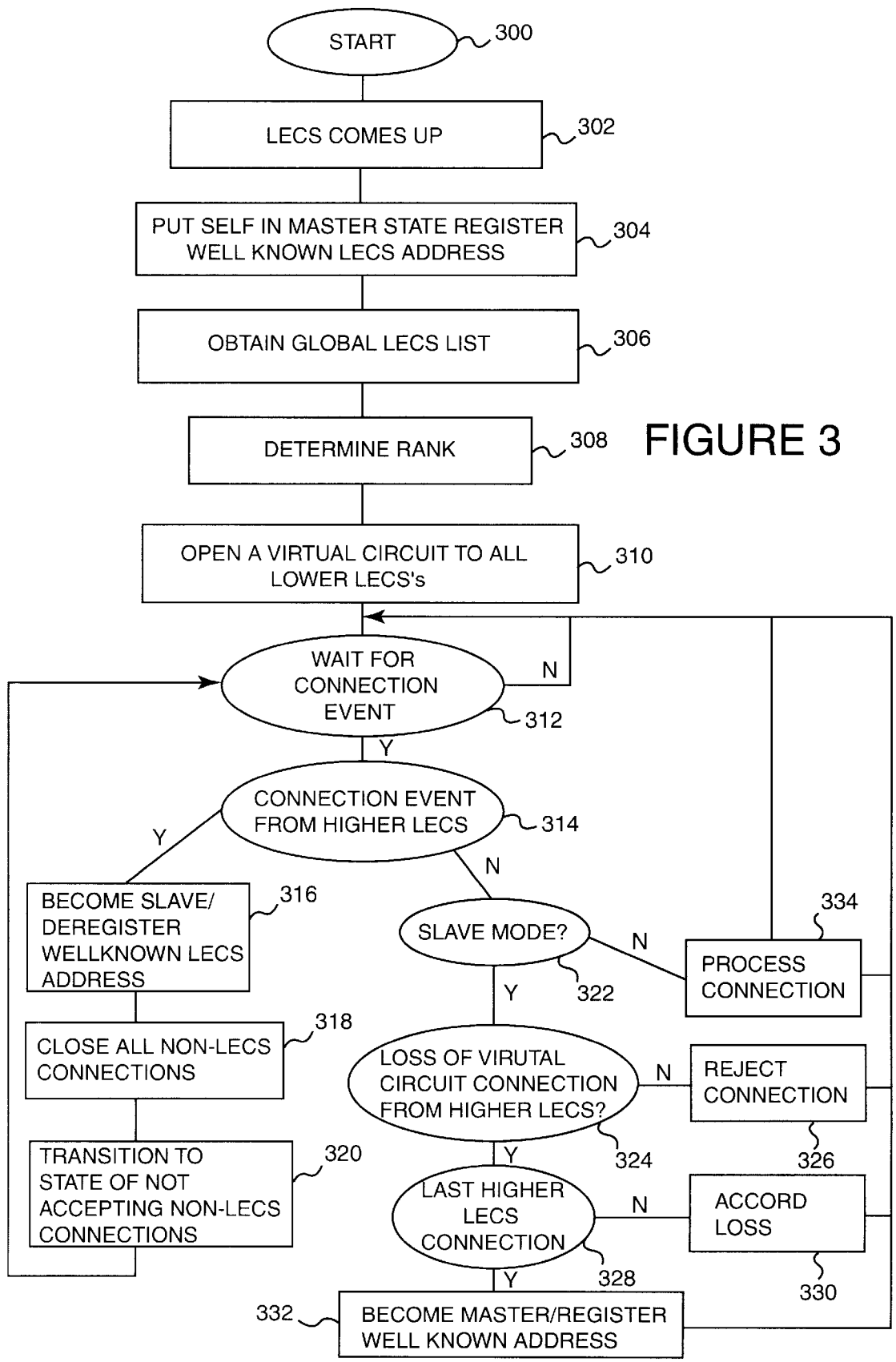
FIG. 3 is a flow chart which shows the protocol which is implemented on each LECS to accomplish the redundancy scheme.

FIG. 3 is a flow chart which shows the protocol which is implemented on any given LECS to accomplish the redundancy scheme. The process starts at a step 300. When the LECS under consideration comes up in a step 302, it first puts itself in the master state in a step 304. Next, in a step 306, the LECS obtains the global LECS list from the ATM switch. In other embodiments, the LECS may either have the global LECS list programmed into it or may obtain the global LECS list from another source. In a step 308, the LECS determines its own rank in the global LECS list. Then, in a step 310, the LECS opens a virtual circuit 210 to all lower LECS's. The LECS then waits for a connection event at a step 312. When a connection event occurs, control is transferred to a step 314, and the LECS checks to see if it has a virtual circuit connection 210 from a higher LECS. If the connection event is creation of a virtual circuit connection 210 with a higher LECS, control transfers to a step 316 and the LECS transitions to the slave state. It then closes all non-LECS connections in a step 318 and transitions to a state of not accepting non-LECS connection in a step 320. Control is transferred back to step 312 and the LECS waits for another connection event.

If the connection event is not creation of a virtual circuit connection 210 by a higher LECS, then control is transferred to a step 322. If the LECS is in slave mode, the only connection event to which it will respond is the loss of a connection from a higher LECS. It therefore checks, in a step 324, whether the connection event is a loss of or an establishment of a virtual circuit connection 210 from a higher LECS. If not, then the connection is rejected in a step 326 and control is transferred back to step 312. If the connection event is the loss of a virtual circuit connection 210 from a higher LECS, then the LECS checks to see if it was the last higher LECS connection in a step 328. If it was not the last higher LECS connection, then the loss of the connection is recorded in a step 330 and control is transferred back to step 312. If the connection event is the loss of the last higher LECS connection, then the LECS transfers to the master state in a step 332, and then waits for another connection event at step 312. When a connection event occurs which is not a virtual circuit connection event from a higher LECS and the LECS is in master mode, then control is transferred to a step 334, the connection is accepted and processed, and control is then transferred back to step 312.

The process of FIG. 3 shows that each LECS, when it is powered up, initially puts itself in master mode and waits for a connection event. Upon receipt of a virtual connection from a higher LECS, each LECS transfers to the slave state. Therefore, although every LECS powers up in the master state, only the highest priority LECS which is operational remains in the master state. Once in the slave state, each slave LECS checks connection events to determine whether it has become the highest priority LECS which is operational, and rejects all non-LECS connections unless and until it becomes the master LECS. If the LECS is the master, then connections are processed normally, according to the LANE specification.

An advantage of this system is that no device is required to manage the LECS's. Each LECS communicates its operational status to all lower LECS's via virtual circuit 210. As long as an LECS has a connection from a higher LECS, it will remain in the slave state, but in a constant state of readiness to become the master upon the loss of all connections from higher LECS's.

FIG. 4A is state table which shows how each LECS will respond to connection attempts from a source 402, depending on whether the LECS is in a master state 404 or a slave state 406. If source 402 is a higher LECS 408, then an LECS in master state 404 will change to slave state 406 and disconnect all non-LECS connections. An LECS in slave state 406, if the connection is from higher LECS 408, will accept the connection and remain in the slave state. If the connection is from a lower LECS 410, then an LECS in master state 404 will not change state and will provide an error message, since the master LECS should never receive a connection from a lower LECS. Likewise, an LECS in slave state 406 will remain in the slave state and provide an error message since no LECS should receive a connection from a lower LECS. If the source of the connection is an LEC or LES, then an LECS in master state 404 will accept the connection and an LECS in slave state 406 will reject the connection.

FIG. 4B is a state table showing the response of an LECS to a disappearing connection from source 402 depending on whether the LECS in master state 404 or slave state 406. If the source 402 of the lost connection is a higher LECS 414, then an LECS in slave state 406 will transition to the master state if no other higher LECS connections remain. If a higher LECS connection remains, then the LECS remains in slave state 406 and notes the loss of the connection. An LECS in master state 404 will not have a connection to higher LECS 414 and so will never lose such a connection. If the lost connection is from an LEC 416, then an LECS in master 406 will not change state. An LECS in slave state 406 rejects all non-LECS connections, and so will never experience the loss of a non-LECS connection.

LES Redundancy

As described above, the LECS directs LEC's to the correct LES for the LAN which the LEC wishes to join. If an LES redundancy scheme is implemented, then the LECS tracks the status of multiple LES 's, determines a master LES, and sends all LEC's to that LES. The LECS is able to track the status of all LES's by monitoring the back end verification circuit established with the LECS by each LES. In addition, the LECS rejects all verification requests from slave LES's so that LEC's connected to slave LES's are dropped by the slave LES's. This causes those LEC's to connect with the LECS so that the LECS can send them to the master LES.

Figure 5A:
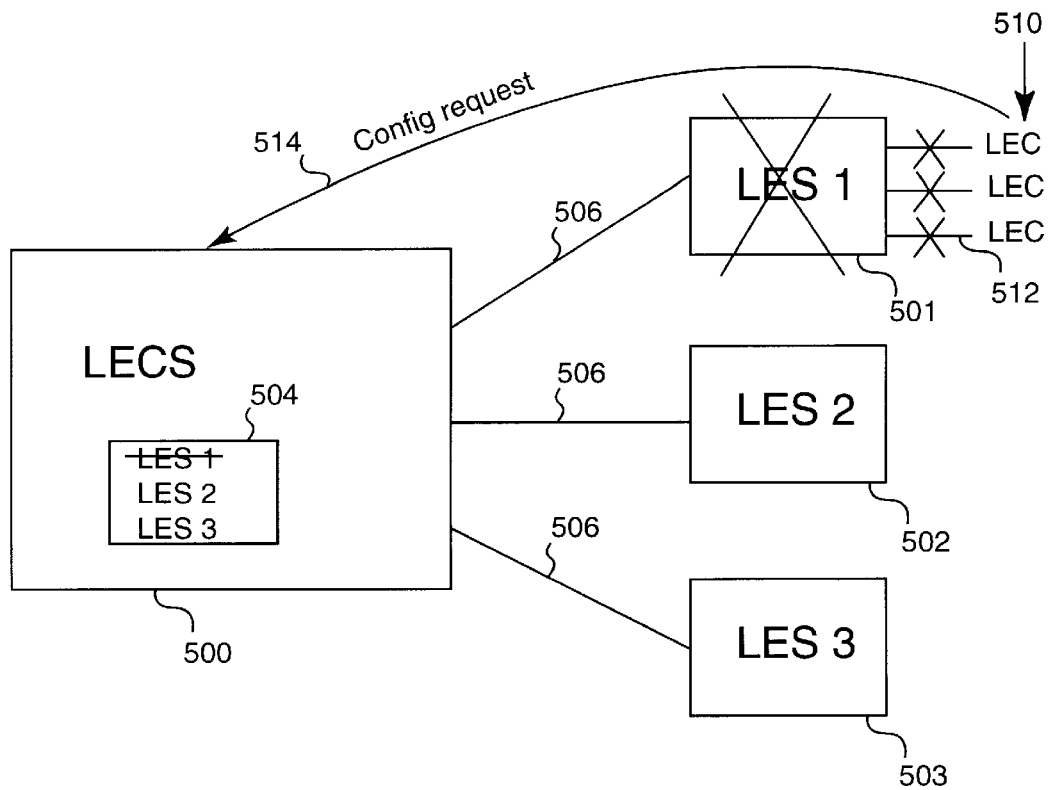
FIGS. 5A and 5B depict the response of a master when the current master LES becomes non-operational.
Figure 5B:
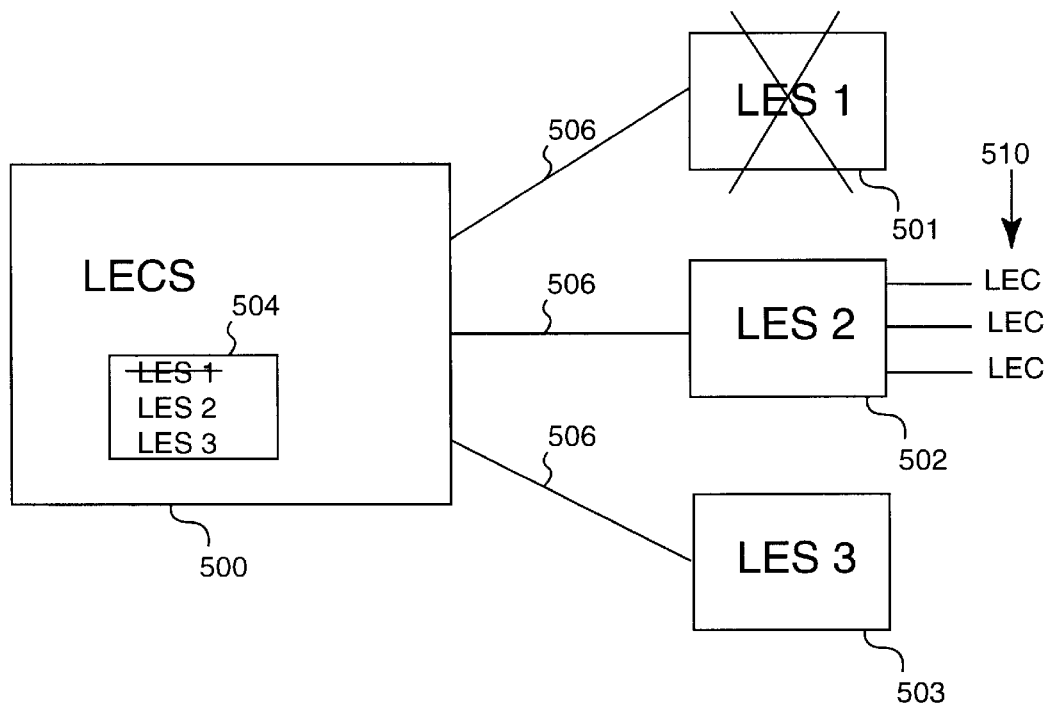

FIGS. 5A and 5B depict the response of a master LECS 500 when the current master LES 502 becomes non-operational. Master LECS 500 includes an ordered table 504, which assigns a priority to and keeps track of all LES's which have established a back end verification circuit 506 with master LECS 500. In the example shown, an LES 501 has the highest priority and so it is the primary LES. An LES 502 is the secondary LES, and an LES 503 is the tertiary LES.

When the current master LES 501 fails, back end verification connection 506 with master LECS 500 is broken. Master LECS 500 notes the loss of back end verification connection 506 from LES 501 in ordered table 504 and also notes that LES 502, which is the secondary LES, still maintains back end verification connection 506 and therefore is operational. LES 502 is promoted to become the master LES. Upon the loss of LES 501, each LEC 510 which was connected to LES 501 recognizes that it has lost its control direct connection 512. Each LEC 510 must then reestablish a connection with an LES to rejoin the ELAN. Therefore, each LEC 510 will send a configure request 514 to master LECS 500.

Referring now to FIG. 5B, each LEC 510 has lost its control direct connection 512 with LES 501 and sent a configure request 514 to master LECS 500. Since master LECS 500 knows from ordered table 504 that LES 501 has ceased to be operational and that LES 502 is now the master LES, master LECS 500 has responded to each configuration request 514 by sending to each LEC 510 the address of LES 502. As a result, each LEC 510 is shown connected to LES 502. LECS 500 continues to recognize back end verification connection 506 with LES 503, the tertiary LES, but does not send any LEC 510 to LES 503 because LES 502, the secondary LES, is still operational. If LES 502 ceases to operational, then backend verification connection 506 between LES 502 and master LECS 500 will be broken and master LECS 500 will know from ordered table 504 that tertiary LES 503 is the new master LES. When the LEC's 510 which were formerly connected to LES 502 send a configure request to master LECS 500, they will be directed to LES 503.

Figure 6A:
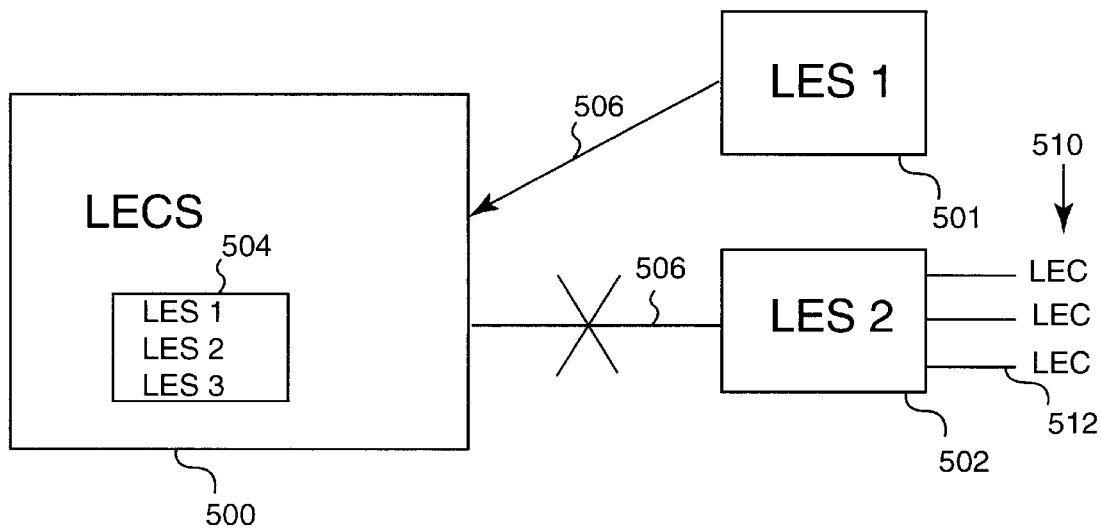
FIGS. 6A through 6C depict the sequence of events which occurs when a higher priority LES, in this case, the primary LES which was a formerly non-operational, becomes operational.
Figure 6C:
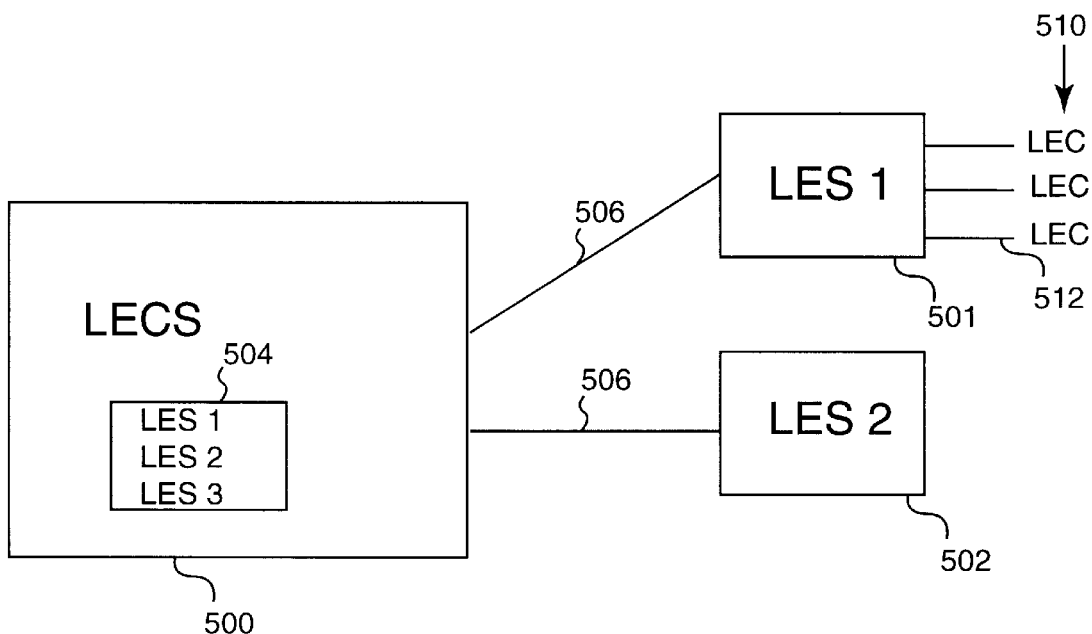
Figure 6B:
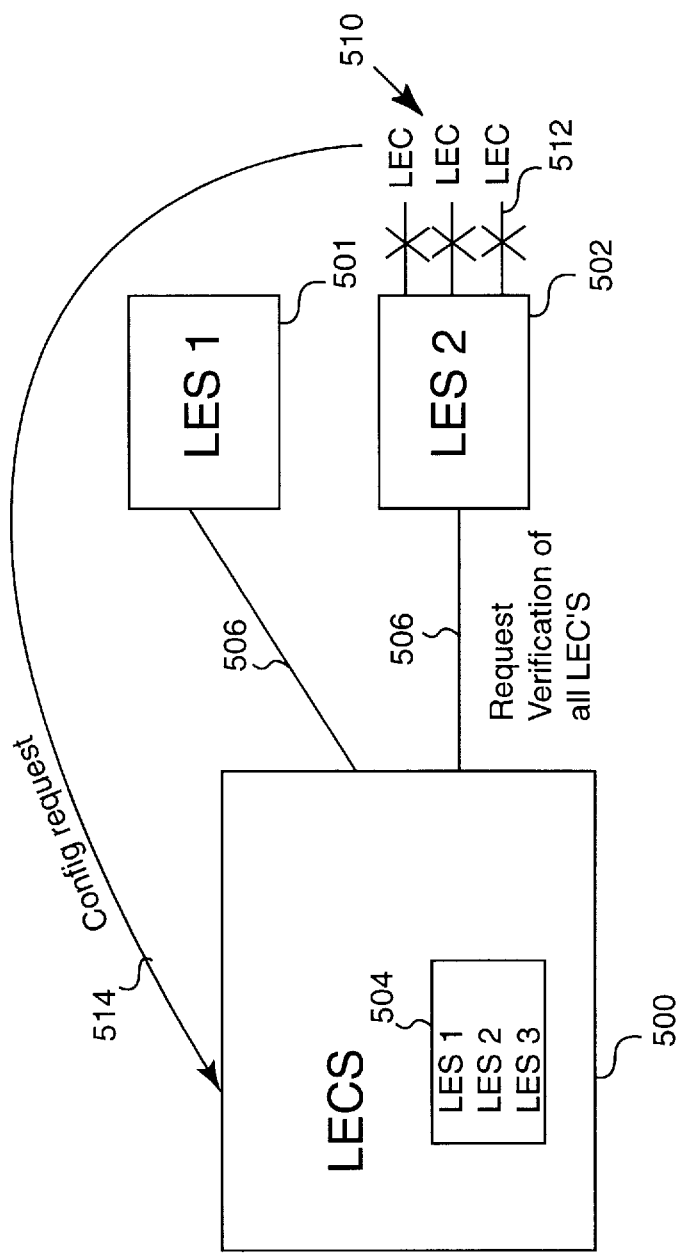

FIGS. 6A through 6C depict the sequence of events which occurs when a higher priority LES, in this case, primary LES 501 which was a formerly non-operational, becomes operational.

Referring to FIG. 6A, LES 501, which was non-operational, becomes operational again. Master LECS 500 detects the presence of backend verification connection 506 and notes in ordered table 504 that LES 501 is again operational. Master LECS 500 recognizes that LES 501 should now be the master LES and that secondary LES 502 should no longer be the master LES. LES 502 therefore redesignates 501 as the master LES. Next, master LECS 500 must have a way of causing each LEC 510 to disconnect from LES 502 and reconnect with LES 501. To do this, master LECS 500 breaks backend verification connection 506 with LES 502. The loss of backend verification connection 506 causes LES 502 to go back to the ATM switch, and obtain the ordered list of LECS's. LES 502 then attempts connections to the LECS's on the ordered list in order, until it finds master LECS 500.

Referring now to FIG. 6B, LES 502 reconnects to master LECS 500 and, upon reconnection, requests verification of each LEC 510. This gives master LECS 500 the opportunity to reject the verification request for each LEC 510, so that each connection 512 between each LEC 510 and LES 502 is broken by LES 502. When this occurs, each LEC 510 will send a configure request to master LECS 500. Master LECS 500 will have the opportunity to redirect each LEC 510 to LEC 501 which is once again operational and has been redesignated as the master LES. FIG. 6C shows that each LEC 510 has been directed by master LECS 500 to reconnect with LEC 501.

Figure 7:
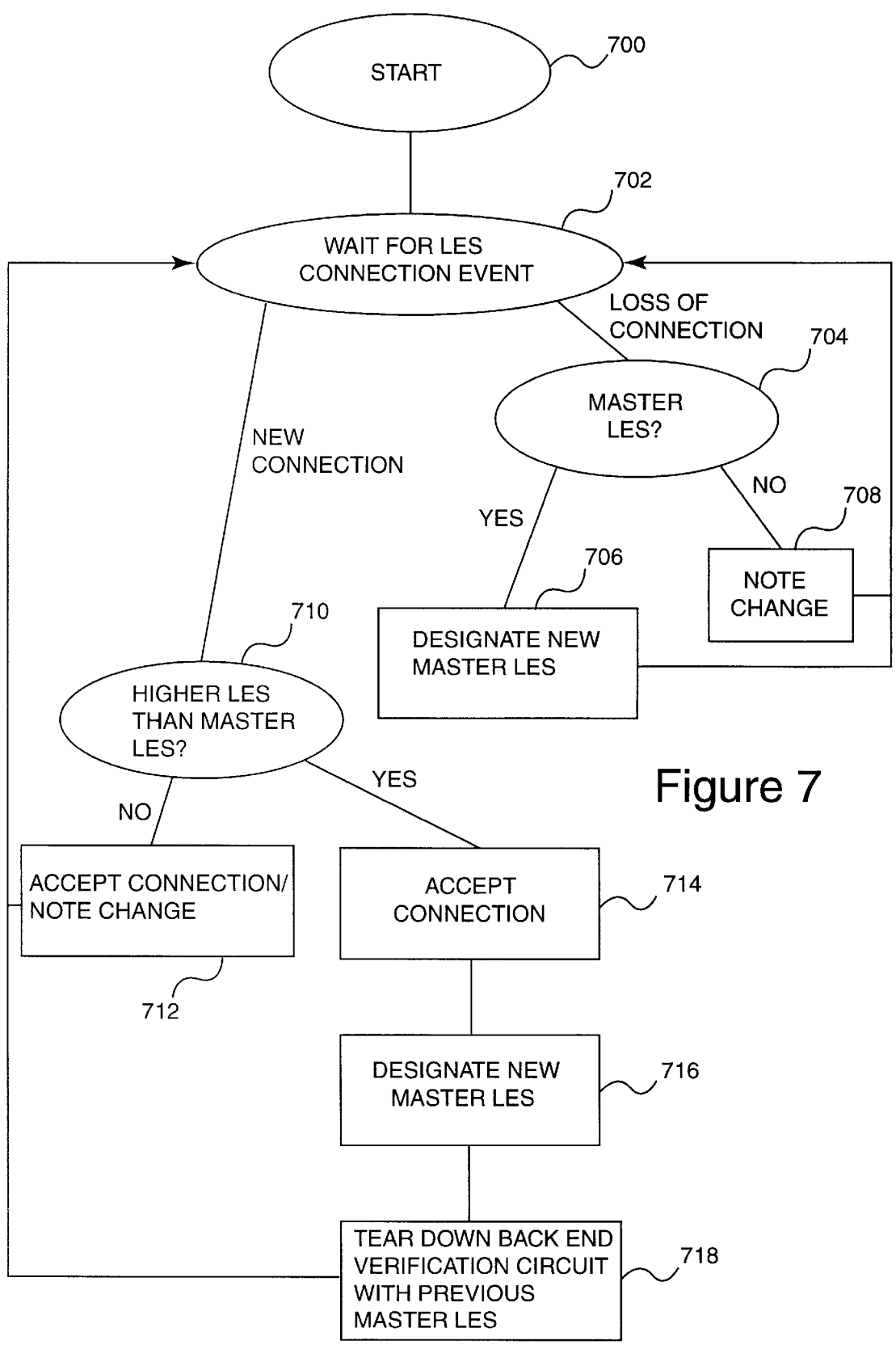
FIG. 7 is a flow chart which depicts the LECS response to a connection event from an LES.

FIG. 7 is a flow chart which depicts the LECS response to a connection event from an LES. The process starts at a step 700 and the LECS waits for an LES connection event at a step 702. Upon the loss of a connection from an LES, control is transferred to step a 704 where the LECS determines whether the loss of the connection was from the master LES. If the lost connection was from the master LES, then the LECS designates a new master LES in a step 706. The new master LES is the next LES which has a back end verification connection to the LECS. If the lost connection was not from the master LES, then the LECS notes the change in the operational status of the LES whose connection was lost in a step 708. Once step 706 or step 708 has been completed, control transfers back to step 702.

If the connection event is a new connection from an LES, then the LECS determines whether the new connection is from a higher LES than the current master LES in a step 710. If not, then the connection is accepted and the change is noted in step a 712 and control is transferred back to step 702. If the new connection is from a higher LES than the master current LES, then the LECS accepts the connection in a step 714 and then designates a new master LES in a step 716. In order to trigger the old master LES to break its connection with all LEC's, the LECS disconnects the back end verification circuit with the previous master LES in a step 718. Once this is accomplished, control transfers back to 702.

Figure 8:
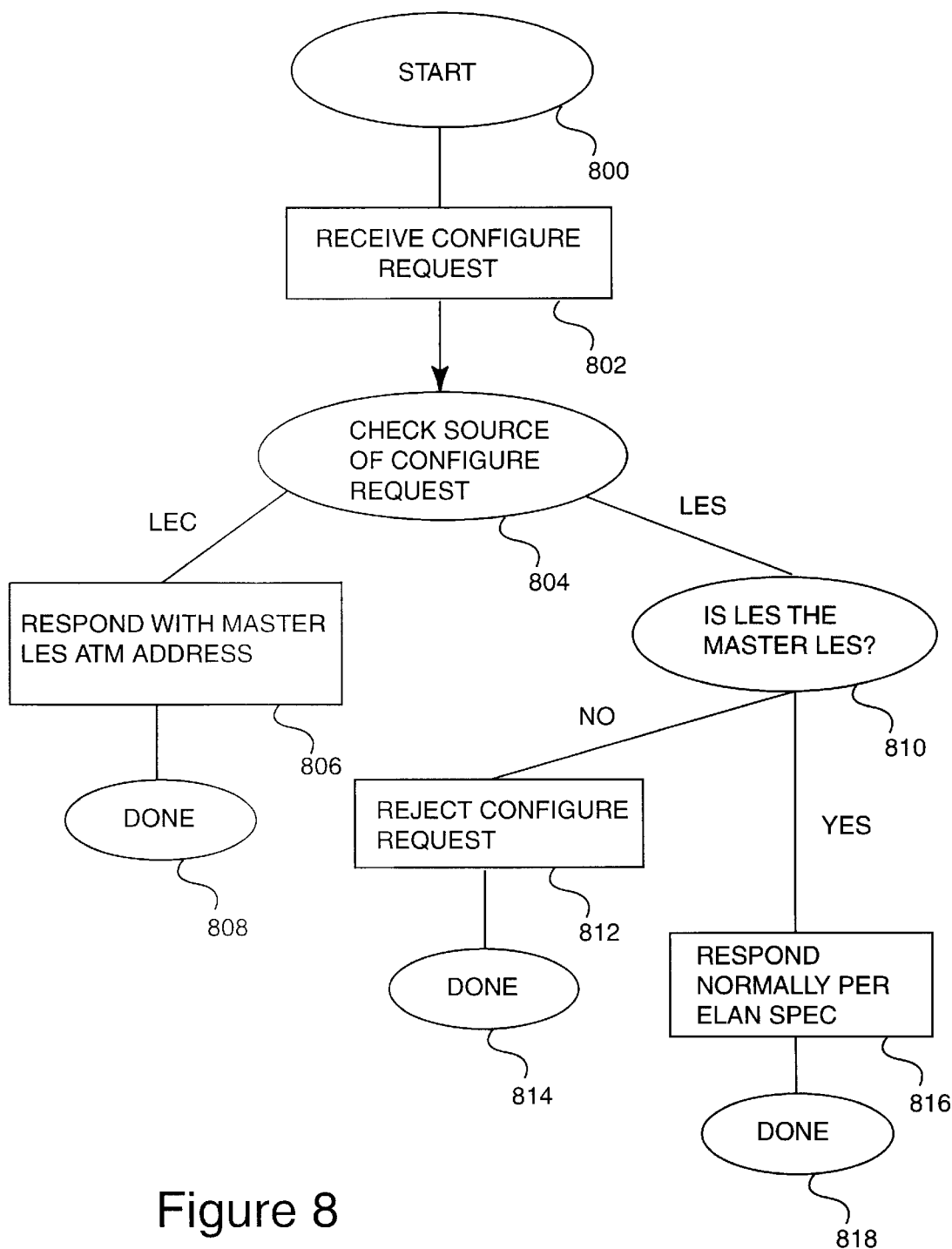
FIG. 8 depicts the response of a master LECS to configure requests from LEC's and LES's.

FIG. 8 depicts the response of a master LECS to configure requests from LEC's and LES's. The process starts in a step 800 and the master LECS receives a configure request in a step 802. In a step 804, the LECS determines the source of the configure request. If the source of the configure request is an LEC, then control is transferred to a step 806 and the LECS responds with the master LES ATM address and the process is finished at a step 808. If the source of the configure request is an LES, then control is transferred to a step 810 where the LECS determines whether the LES which sent the configure request is the master LES. If the LES is not the master LES, then the configure request is rejected in a step 812 and the process is finished at a step 814. If the source of the configure was a master LES then the LECS responds as normally per the ELAN specification in a step 816 and the process is finished at a step 818.

This process shows how the LECS rejects all configure requests which are sent through an LES which is not the master LES. This will cause that LES to break all connections with all LEC's connected to it. The LEC's will then send a configure request to the LECS and in step 806, the LECS will respond with the master LES ATM address, causing those LEC's to connect to the master LES. Since those configure requests sent through the master LES will be accepted in step 816, those clients will be able to join the ELAN through the correct master LES.

FIG. 9A is a state table which depicts the response of the LECS to incoming connections from an LES source 900 depending on whether the LECS is in a master state 902 or a slave state 904. If the incoming connection is from a lower LES 906, then a LECS in master state 902 will accept the connection and note the change. If the LECS is in slave state 904, then it will reject the connection since an LES should not be attempting to connect to an LECS which is not in master state 902. If the connection is from a higher LES 908 than master LES, then the LECS, if it is in master state 902, will accept the connection and change the master LES. Upon changing the master LES, the master LECS will disconnect the back end verification circuit with the former master LES. This will prompt the former master LES to verify all LEC's connected to it with the master LECS upon reconnection the master LECS. This gives the master LECS the opportunity to reject those clients and cause to check them back in with the master LECS and get the address of the new master LES. An LECS in slave state 904 will reject a connection from any LES since the LES should not be attempting to connect to a slave LECS.

FIG. 9B is a state table which shows the response of an LECS to the loss of a connection from an LES. If the LES source 900 is a slave, the LECS in master state 902 will note the loss of the slave LES in its ordered table of operational LES's and not change the status of the master LES. A LECS in slave state 904 will not have accepted any connections from any LES's and so will not experience the loss of such a connection. An LECS in master state 902 which loses a connection from the master LES will note the loss of that connection in the table of operational LES's and then designate the next highest LES as the master LES. The LECS will then accept configure requests which originate from the new master LES.

Figure 10:
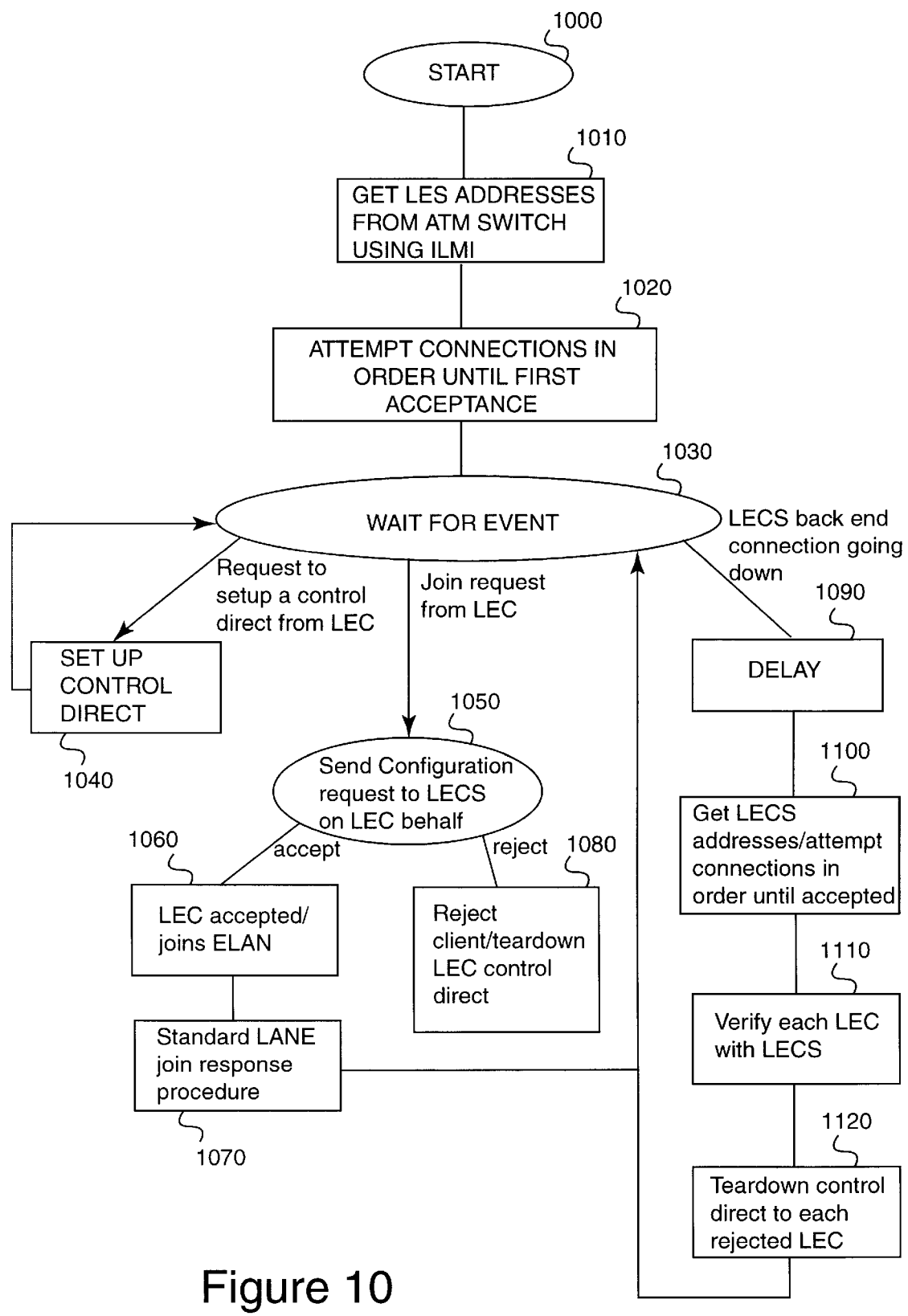
FIG. 10 depicts the process which is implemented on each LES in order to implement LES redundancy.

FIG. 10 depicts the process which is implemented on each LES in order to implement LES redundancy. The process starts at a step 1000. The LES first gets the addresses of the LECS's from the ATM switch in a step 1010. The addresses may be obtained using the Interim Local Management Interface (ILMI). The ILMI is a point to point interface that allows information to be exchanged between the ATM switch and locally attached entities. Alternatively, the addresses may be transmitted to the LES by some other means or may be programmed into in the LES. The LES then attempts connections in the order of the hierarchy of the ordered list obtained from the ATM switch in a step 1020 until a connection is accepted by the master LECS. Control then transfers to a step 1030 and the LES waits for an event. If the event is a request to set up a control direct from an LEC, then the LES sets up a control direct with the LEC in a step 1040 and control returns to a step 1030. If the event is a join request from an LEC, then control transfers to a step 1050 and the LES sends a configure request to the master LECS on the LEC's behalf. If the master LECS accepts the LEC then the LES allows the LEC to join the ELAN in a step 1060 and provides the standard LANE join response procedure in a step 1070. Control then returns to step 1030. If the configure request for the LEC is rejected, then the LES rejects the LEC and tears down the control direct to the LEC in a step 1080 and control returns to step 1030.

If the event is an LECS connection going down, then a step 1090 delays for a few seconds. In one specific embodiment, a three second delay is used. The LES then gets the LECS address list from the ATM switch and attempts connections in the hierarchical order until a connection is accepted from the master LECS. Once a connection is established with the master LECS, then the LES verifies each LEC with the LECS in a step 1110. In a step 1120, the control direct to each rejected LEC is dropped.

The above process, implemented on each LES, enables clients to be connected to a primary master LES and to be transferred to a secondary LES upon the failure of the primary LES. Each LES accepts control direct connections from any LEC and sends configure requests to the master LECS for each LEC which wants to joint the ELAN. If a request is rejected by the master LECS, then the LES tears down the control direct connection to the LEC and the LEC returns to the master LECS for the address of the correct master LES. When an LES notices that the back end verification connection with the master LECS is broken, the LES goes to the ATM switch and gets the LECS addresses and reconnects to the master LECS. If the reason that the LECS back end verification connection was broken is that the LES is no longer the master LES, then when the LES attempts to verify each LEC with the master LECS in step 1110, the LECS will reject the LEC's and the LES will the tear down the control direct with those LEC's. If the reason that the back end verification connection was broken is that the master LECS is non-operational and the LES is directed to a new master LECS, then the new master LECS will verify each client and each LEC will remain connected to the same master LES.

LEC Configuration

Figure 11:
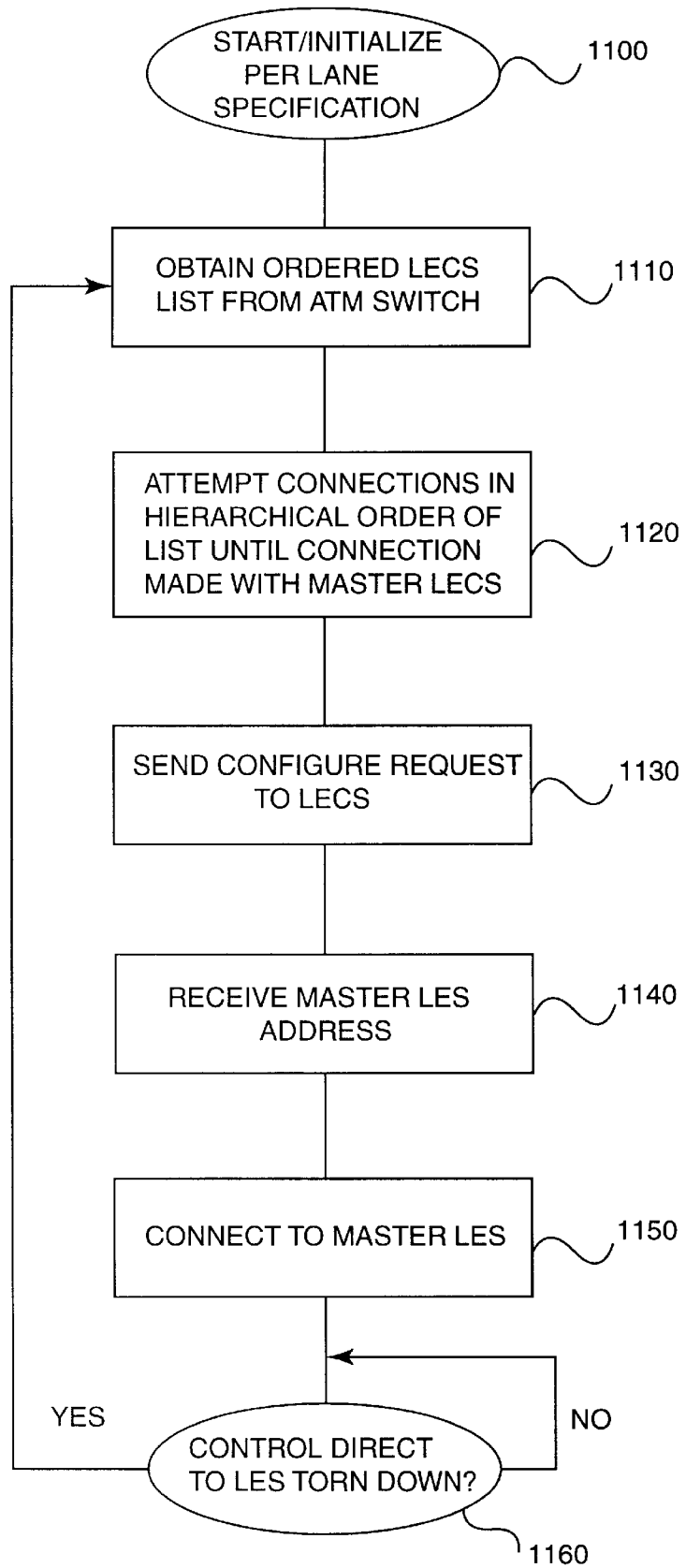
FIG. 11 depicts the process implemented on each LEC in order to implement both LECS and LES redundancy.

FIG. 11 depicts the process implemented on each "smart" LEC in order to implement both LECS and LES redundancy. As noted above, the LECS and LES redundancy scheme may also be implemented for "dumb" LEC's by having the LECS's register the well known address at the ATM switch as part of the transition to the master state and de-register the well known address as part of the transition to the slave state. The process begins in a step 2100, and the LEC initializes per the ELAN specification. In a step 2110, the client gets the ordered LECS list from the ATM switch. The LEC then attempts connections in the hierarchical order of the list until a connection is made with the master LECS in a step 2120. Once the connection is made to the master LECS, the LEC sends a configure request to the LECS in a step 2130. In response to the configure request, the LEC receives the master LES address in a step 2140 and connects to the master LES in a step 2150. Once the LEC is connected to the LES, it has successfully joined the ELAN. The LEC remains connected to the master LES and the LEC monitors its connection with the LES in a step 2160. If the control direct to the LES is dropped, then control transfers to a step 2110 and the LEC gets the hierarchical LECS list from the ATM switch and repeats the rest of the process.

An advantage of this scheme is that the LEC's do not need to determine the state of or keep track of the failure of edge devices. Any LES always responds to LEC requests to set up a control direct and forwards configure requests to the master LECS. The master LECS determines the master LES by rejecting all configure requests from slave LES's. Since the LES's tear down the control direct with all rejected LEC's, an LEC which connects to the wrong LES or LECS will eventually be sent back to go find the master LECS whereupon, the LEC will be directed to the master LES The redundant LES and LECS scheme presented above is described in a way that does not require deviation from the LANE specification. This is one advantage of the scheme. However, it is also possible to implement within the scope of this invention other systems which do not conform to the LANE specification. The present invention could be used to implement redundancy in any multi-level hierarchical server based system.

It should also be recognized that, although the slave LECS's and LES's have been described as being dormant and not functioning in the ELAN while another LECS or LES is the master, the redundancy scheme described herein also may be applied to a partitioned network. In a partitioned network, a certain servers act as masters for certain ELAN traffic, while functioning as slaves or backups for other traffic. The transition to the master state with respect to a partition simply causes the server to accept traffic from that partition for which it is newly a master, as well as any other partition for which it is already a master.

Although the foregoing invention has been described in some detail for purposes of clarity of understanding, it will be apparent that certain changes and modifications may be practiced within the scope of the appended claims.

What is claimed is:

1. In an Lan Emulation Configuration Server configured for use in an ATM network implementing a LAN emulation, a method of selecting a master Lan Emulation Configuration Server from among a plurality of Lan Emulation Configuration Servers in the ATM network, the method comprising:

determining a relative hierarchical position among said plurality of Lan Emulation Configuration Servers said relative hierarchical position specifying that a given Lan Emulation Configuration Server is a higher Lan Emulation Configuration Server with respect to other Lan Emulation Configuration Servers lower hierarchical positions and said given Lan Emulation Configuration Server is a lower Lan Emulation Configuration Server with respect to other Lan Emulation Configuration Servers in higher hierarchical positions;

establishing a connection from said Lan Emulation Configuration Server to any other Lan Emulation Configuration Servers which are lower Lan Emulation Configuration Servers with respect to said Lan Emulation Configuration Server;

detecting any connections made by higher Lan Emulation Configuration Servers; and if a connection is detected from a higher Lan Emulation Configuration Server, assuming the state of slave Lan Emulation Configuration Server, otherwise assuming the state of master Lan Emulation Configuration Server.

2. The method of claim 1 further comprising assuming the state of master Lan Emulation Configuration Server until said Lan Emulation Configuration Server receives a connection from a higher Lan Emulation Configuration Server.

3. The method of claim 1 further comprising while in the state of slave Lan Emulation Configuration Server detecting the loss of a connection from a higher Lan Emulation Configuration Server;

determining if said loss of a connection was a last connection from a higher level Lan Emulation Configuration Server; and if said loss of a connection was the last connection from a higher Lan Emulation Configuration Server, assuming the state of the master Lan Emulation Configuration Server.

4. The method of claim 1 further comprising:

while in the state of master Lan Emulation Configuration Server, receiving a connection from a higher Lan Emulation Configuration Server; transitioning to the state of slave Lan Emulation Configuration Server; and closing any non-Lan Emulation Configuration Server connections.

5. The method of claim 1 wherein assuming the state of master Lan Emulation Configuration Server further comprises registering a well known Lan Emulation Configuration Server address at an ATM switch.

6. The method of claim 1 wherein assuming the state of slave Lan Emulation Configuration Server further comprises de-registering a well known Lan Emulation Configuration Server address at an ATM switch.

7. In a device configured for use in an ATM network implementing a LAN emulation, a method of establishing and maintaining a connection to a master Lan Emulation Configuration Server the method comprising:

evaluating a hierarchical list having an order ranking a plurality of Lan Emulation Configuration Servers;

attempting connections from said device to each said Lan Emulation Configuration Servers according to the order of said hierarchical list;

establishing a connection between said device and a first Lan Emulation Configuration Server for which an attempted connection is successful, said first Lan Emulation Configuration Server being a master Lan Emulation Configuration Server; and if said first Lan Emulation Configuration Server is redesignated as a slave Lan Emulation Configuration Server, breaking said connection.

8. The method of claim 7 wherein said device is an Lan Emulation Client.

9. The method of claim 7 wherein said device is an Lan Emulation Server.

10. The method of claim 7, wherein in said step of reviewing, said hierarchical list is provided on an ATM switch, and wherein the hierarchical list provides, for each listed Lan Emulation Configuration Server, a respected ATM address.

11. An Lan Emulation Configuration Server having a determinable state and being configured for use in an ATM network implementing a LAN emulation, said Lan Emulation Configuration Server comprising:

means for determining a hierarchical position of said Lan Emulation Configuration Server among a plurality of Lan Emulation Configuration Servers;

means for establishing a connection from said Lan Emulation Configuration Server to each lower Lan Emulation Configuration Server of said plurality of Lan Emulation Configuration Servers, said each lower Lan Emulation Configuration Server being in a lower hierarchical position relative to said Lan Emulation Configuration Server;

means for detecting connections made to said Lan Emulation Configuration Server by a higher Lan Emulation Configuration Server of said plurality of Lan Emulation Configuration Servers said higher Lan Emulation Configuration Server being in a higher hierarchical position relative to said Lan Emulation Configuration Server; and means for switching said determinable state between a master state and slave state consistent with said hierarchical position and said connections made to said Lan Emulation Configuration Server.

12. The Lan Emulation Configuration Server of claim 11, further comprising:

means for setting said determinable state to be a slave state upon the detection of a connection from a higher Lan Emulation Configuration Server.

13. The Lan Emulation Configuration Server of claim 11, wherein said means for switching said determinable state initially sets said determinable state to the master state upon power up by said Lan Emulation Configuration Server.

14. The Lan Emulation Configuration Server of 11 wherein said means for switching said determinable state switches said determinable state from the slave state to the master state upon the loss of a connection from a last remaining connected higher Lan Emulation Configuration Server.

15. A device configured for connection to a master Lan Emulation Configuration Server in an ATM network implementing a LAN emulation, the device comprising:

means for evaluating a hierarchical list having an order which ranks a plurality of Lan Emulation Configuration Servers and their respective ATM addresses from an ATM switch;

means for atttempting connections to said Lan Emulation Configuration Servers according to the order of said hierarchical list; and means for establishing a connection between said device and a first Lan Emulation Configuration Server for which attempted connection is successful, said first Lan Emulation Configuration Server being a master Lan Emulation Configuration Server.

16. The device of claim 15 wherein said device is an Lan Emulation Client.

17. The device of claim 15 wherein said device is an Lan Emulation Server.

18. The device of claim 17 wherein said Lan Emulation Server further includes means for verifying a connected Lan Emulation Client with said first Lan Emulation Configuration Server.

19. The device of claim 15 further comprising means for maintaining said connection as long as said first Lan Emulation Configuration Server is a master Lan Emulation Configuration Server.

20. In an Lan Emulation Configuration Server configured for use in an ATM network implementing a LAN emulation, a method for designating a master Lan Emulation Server comprising:

for each Lan Emulation Server within a set of Lan Emulation Servers associated with said Lan Emulation Configuration Server, specifying a hierarchical position such that said each Lan Emulation Server is a higher Lan Emulation Server with respect to all other Lan Emulation Servers in an lower hierarchical position and said each Lan Emulation Server is a lower Lan Emulation Server with respect to all other Lan Emulation Servers in a higher hierarchical position;

establishing a verification connection from each of said Lan Emulation Servers which is operational to said Lan Emulation Configuration Server;

maintaining data indicating which members of the set of Lan Emulation Servers is connected to said master Lan Emulation Configuration Server;

determining the highest Lan Emulation Server which is connected to said Lan Emulation Configuration Server; and designating said highest Lan Emulation Server as the master Lan Emulation Server.

21. The method of claim 20 further including:

detecting the nonoperational status of a previously operational master Lan Emulation Server;

determining a next hightest operational Lan Emulation Server in said set of Lan Emulation Servers; and designating said next highest operational Lan Emulation Server in said set of Lan Emulation Servers as the master Lan Emulation Server.

22. The method of claim 20 further including:

receiving a new connection from a newly operational Lan Emulation Server which has a hierarchical position that is higher than said master Lan Emulation Server;

dropping said verification connection with said master Lan Emulation Server;

redesignating said master Lan Emulation Server as a slave Lan Emulation Server; and designating said newly operational Lan Emulation Server as the master Lan Emulation Server.

23. The method of 22 further including:

breaking a verification connection with said slave Lan Emulation Server;

rejecting verification requests from said slave Lan Emulation Server for Lan Emulation Configuration Servers connected to said slave Lan Emulation Server; and directing said Lan Emulation Configuration Servers connected to said slave Lan Emulation Server to said master Lan Emulation Server;

whereby said each Lan Emulation Client is disconnected from said slave Lan Emulation Server and said each Lan Emulation Client is connected to said new current master Lan Emulation Server.

24. The method of claim 20 wherein a verification connection with an Lan Emulation Server which is operational is detected by said Lan Emulation Configuration Server and is detected by said Lan Emulation Server.

25. The method of claim 20 wherein a verification connection with an Lan Emulation Server which is operational is automatically broken when said Lan Emulation Server becomes non-operational.

26. The method of claim 20 wherein verification connection with an Lan Emulation Server which is operational may be selectively broken by said Lan Emulation Configuration Server.

27. An Lan Emulation Configuration Server comprising:
   means for assigning to each Lan Emulation Server within a set of Lan Emulation Servers a hierarchical position such that said each Lan Emulation Server is a higher Lan Emulation Server with respect to all other Lan Emulation Servers in a lower hierarchical position and said each Lan Emulation Server is a lower Lan Emulation Server with respect to all other Lan Emulation Servers in a higher hierarchical position;
   means for establishing a verification connection with each of said Lan Emulation Servers which is operational;
   means for determining which members of said set of Lan Emulation Servers are connected to said Lan Emulation Configuration Server;
   means for redesignating a current master Lan Emulation Server as a slave Lan Emulation Server and dropping said verification connection with said slave Lan Emulation Server;
   means for rejecting all verification requests from said slave Lan Emulation Server; and
   means for directing an Lan Emulation Client previously connected to said slave Lan Emulation Server to a new master Lan Emulation Server;
   whereby said Lan Emulation Configuration Servers is configured to redirect an Lan Emulation Client to a new master Lan Emulation Server.

28. The Lan Emulation Configuration Servers of claim 27 further comprising:
   means for detecting said verification connection with each of said Lan Emulation Servers which is operational.

29. The Lan Emulation Configuration Server of claim 27 further comprising:
   means for selectively breaking a verification connection with an operational Lan Emulation Server.

30. An Lan Emulation Server comprising:
   means for establishing a verification connection with an Lan Emulation Configuration Server;
   means for sending a verification request to a master Lan Emulation Configuration Server for each Lan Emulation Client connected to said Lan Emulation Server; and
   means for tearing down all connections between said Lan Emulation Server and said each Lan Emulation Client connected to said Lan Emulation Server upon the rejection of a verification request associated with said each Lan Emulation Client connected to said Lan Emulation Server;
   whereby said Lan Emulation Server either verifies or drops all Lan Emulation Client connections upon connection to the master Lan Emulation Configuration Servers.

31. THE Lan Emulation Server of claim 30, further comprising means for locating the master Lan Emulation Configuration Server upon the loss of said verification connection.

* * * * *